US011821657B2

(12) United States Patent
Yamamoto et al.

(10) Patent No.: US 11,821,657 B2
(45) Date of Patent: *Nov. 21, 2023

(54) WASTE-HEAT RECOVERY SYSTEM IN OIL-COOLED GAS COMPRESSOR

(71) Applicant: Hitachi Industrial Equipment Systems Co., Ltd., Tokyo (JP)

(72) Inventors: Kentaro Yamamoto, Tokyo (JP); Masahiko Takano, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/674,909

(22) Filed: Feb. 18, 2022

(65) Prior Publication Data

US 2022/0170666 A1 Jun. 2, 2022

Related U.S. Application Data

(63) Continuation of application No. 16/748,062, filed on Jan. 21, 2020, now Pat. No. 11,300,322, which is a (Continued)

(30) Foreign Application Priority Data

Jan. 28, 2013 (JP) .................... 2013-013358

(51) Int. Cl.
*F25B 43/02* (2006.01)
*F24H 1/20* (2022.01)
(Continued)

(52) U.S. Cl.
CPC ............. *F24H 1/208* (2013.01); *F04B 39/06* (2013.01); *F04B 41/00* (2013.01); *F04B 53/08* (2013.01); *F04C 29/04* (2013.01)

(58) Field of Classification Search
CPC ........ F04B 39/02; F04B 39/027; F04B 53/08; F04C 18/16; F04C 29/04; F04C 2240/81;
(Continued)

(56) References Cited

U.S. PATENT DOCUMENTS 3,856,493 A * 12/1974 Bulkley ................. F04C 29/04
417/247
4,238,931 A   12/1980 Campbell
(Continued)

FOREIGN PATENT DOCUMENTS

AU    2005280682 A1    3/2006
CN    102109239 A      6/2011
(Continued)

OTHER PUBLICATIONS

International Search Report (PCT/ISA/210) dated Mar. 18, 2014, with English translation (four (4) pages).
(Continued)

*Primary Examiner* — Gregory A Wilson
(74) *Attorney, Agent, or Firm* — Crowell & Moring LLP (57) ABSTRACT

A waste-heat recovery system includes a waste-heat-recovery heat a tank, a circulation circuit, a circulation pump, and a control device that is configured to obtain the temperature of the heat medium flowing through a heat medium outlet piping of the circulation circuit and the temperature of the water stored in the tank. The control device stops the circulation pump or reduces the rotational frequency thereof in a case where the temperature of the heat medium flowing through the heat medium outlet piping is lower, or lower by a predetermined temperature or more, than the temperature of the water.

3 Claims, 4 Drawing Sheets

Related U.S. Application Data continuation of application No. 16/032,554, filed on Jul. 11, 2018, now Pat. No. 10,578,339, which is a continuation of application No. 14/763,358, filed as application No. PCT/JP2014/050548 on Jan. 15, 2014, now Pat. No. 10,041,698.

(51) Int. Cl.
  *F04B 39/06* (2006.01)
  *F04C 29/04* (2006.01)
  *F04B 41/00* (2006.01)
  *F04B 53/08* (2006.01)

(58) Field of Classification Search
  CPC ............ F04C 2270/195; F04D 29/5826; F25B 43/02; F25B 31/004; F28D 1/02; F28D 1/0408; F28D 1/0417; F28D 1/05391; F24H 1/208; F24H 9/2007
  See application file for complete search history.

(56) References Cited

U.S. PATENT DOCUMENTS

| | | | |
|---|---|---|---|
| 4,731,102 A * | 3/1988 | Yoshino | ................ F25J 3/0486 62/913 |
| 6,347,528 B1 * | 2/2002 | Iritani | ................ B60H 1/3207 62/434 |
| 6,644,400 B2 | 11/2003 | Irwin | |
| 8,590,324 B2 | 11/2013 | Guo | |
| 9,441,638 B2 | 9/2016 | Takano | |
| 10,746,177 B2 * | 8/2020 | Collins | .................... F25B 5/02 |
| 2006/0269424 A1 | 11/2006 | North | |
| 2008/0127665 A1 | 6/2008 | Fournier | |
| 2008/0166253 A1 | 7/2008 | Fujimoto et al. | |
| 2009/0087320 A1 * | 4/2009 | Tanaka | .................... F04C 29/04 165/104.19 |
| 2011/0000227 A1 * | 1/2011 | Kamiya | .................. F04C 29/04 62/505 |
| 2011/0154840 A1 | 6/2011 | Mihara et al. | |
| 2012/0315158 A1 | 12/2012 | Klaus | |
| 2013/0067951 A1 | 3/2013 | Fujioka et al. | |
| 2013/0156548 A1 | 6/2013 | Takano et al. | |
| 2016/0186757 A1 | 6/2016 | Collins | |

FOREIGN PATENT DOCUMENTS

| | | | |
|---|---|---|---|
| CN | 201858121 U * | 6/2011 | |
| CN | 202402252 U | 8/2012 | |
| CN | 102777358 A * | 11/2012 | |
| CN | 202579097 U * | 12/2012 | |
| CN | 202579188 U | 12/2012 | |
| DE | 20 2007 011 546 U1 | 2/2009 | |
| DE | 10 2011 017 433 A1 | 10/2012 | |
| EP | 1 072 453 A2 | 1/2001 | |
| EP | 2 009 371 A1 | 12/2008 | |
| EP | 2 339 265 A2 | 6/2011 | |
| JP | 56-165912 U | 12/1981 | |
| JP | 58-67981 A | 4/1983 | |
| JP | 60-21880 U | 2/1985 | |
| JP | 61-179387 U | 11/1986 | |
| JP | 3-67966 U | 7/1991 | |
| JP | 2003-172498 A | 6/2003 | |
| JP | 2006-125302 A | 5/2006 | |
| JP | 2006125302 A * | 5/2006 | |
| JP | 2006-250523 A | 9/2006 | |
| JP | 2008-163926 A | 7/2008 | |
| JP | 2009-121398 A | 6/2009 | |
| JP | 4329875 B1 | 9/2009 | |
| JP | 2010-38385 A | 2/2010 | |
| JP | 2011-226467 A | 11/2011 | |
| JP | 2012-4132 A | 1/2012 | |
| JP | 2012-47415 A | 3/2012 | |
| JP | 2012-67743 A | 4/2012 | |
| JP | 2012-167675 A | 9/2012 | |
| JP | 2012-211513 A | 11/2012 | |
| JP | 2012-211712 A | 11/2012 | |
| NI | 2013-D60400 | 12/2012 | |
| WO | WO 94/25811 A1 | 11/1994 | |
| WO | WO 2007/114187 A1 | 10/2007 | |
| WO | WO 2008/064457 A1 | 6/2008 | |
| WO | WO-2008069457 A1 * | 6/2008 | .......... H04W 56/002 |
| WO | WO 2012/026317 A1 | 3/2012 | |
| WO | WO 2012/054986 A1 | 5/2012 | |

OTHER PUBLICATIONS

Chinese-language Office Action issued in counterpart Chinese Application No. 201480006338.6 dated May 30, 2016 with English translation (12 pages).

Chinese Office Action issued in counterpart Chinese Application No. 201480006338.6 dated Nov. 16, 2016 with English-language translation (sixteen (16) pages).

Extended European Search Report issued in counterpart European Application No. 14743578.8 dated Aug. 16, 2016 (eight (8) pages).

Japanese Office Action issued in counterpart Japanese Application No. 2016-152635 dated Jun. 13, 2017 with English translation (15 pages).

European Office Action issued in counterpart European Application No. 14 743 578.8 dated Nov. 27, 2017 (four pages).

Japanese-language Office Action issued in counterpart Japanese Application No. 2016-152635 dated Apr. 3, 2018 with English translation (Five (5) pages).

Japanese-language Office Action issued in Japanese Application No. 2016-152635 dated Jan. 29, 2019 with English translation (six (6) pages).

Extended European Search Report issued in counterpart European Application No. 19156289.1 dated Mar. 21, 2019 (nine (9) pages).

Communication pursuant to Article 94(3) EPC issued in European Application No. 19156289.1 dated Mar. 9, 2020 (four (4) pages).

Japanese-language Office Action issued in Japanese Application No. 2020-151725 dated Nov. 2, 2021 with English translation (eight (8) pages).

Communication of a Notice of Opposition issued in European Application No. 19156289.1 dated Dec. 9, 2021 (30 pages).

* cited by examiner

WASTE-HEAT RECOVERY SYSTEM IN OIL-COOLED GAS COMPRESSOR

CROSS-REFERENCE

This application is a continuation of U.S. application Ser. No. 16/748,062 filed Jan. 21, 2020, which is a continuation of U.S. application Ser. No. 16/032,554, filed Jul. 11, 2018, now U.S. Pat. No. 10,578,339 issued on Mar. 3, 2020, which is a continuation of U.S. application Ser. No. 14/763,358, filed Jul. 24, 2015, now U.S. Pat. No. 10,041,698 issued on Aug. 7, 2018, which is a 371 of International Application No. PCT/JP2014/050548, filed Jan. 15, 2014, which claims priority from Japanese Patent Application No. 2013-013358, filed Jan. 28, 2013, the disclosures of which are expressly incorporated by reference herein.

TECHNICAL FIELD

The present invention relates to a waste-heat recovery system in an oil-cooled gas compressor, particularly relates to a system of recovering waste-heat from an oil-cooled air compressor.

BACKGROUND ART

It is said that combined energy consumed by a gas compressor of an air compressor or the like corresponds to 20 through 25% of an energy consumed by a total of a plant and an effect of recovering waste-heat from the gas compressor is significant. Particularly, it is anticipated that utilization of waste-heat from a gas compressor is going to be regarded to be more and more important in the future also for achieving a target of reducing a $CO_2$ emission amount originated from the global warming problem.

A gas compressor is configured by a compressor main body for compressing gas of air or the like, a cooling system for absorbing heat generated by a compressive operation, a motor which is a driving power source of the compressor and the like. Further, in a gas compressor, when motor input power is regarded as 100%, an amount of heat absorbed in the cooling system corresponds to 90% or more of the motor input power, the amount of heat is ordinarily emitted to external air, and a very large amount of energy is emitted to the atmosphere. Although high efficiency formation of the compressor main body or the motor is promoted for reducing the emitted heat amount, its effect is limited to several %, and it is requested to effectively utilize the waste-heat from the gas compressor.

With regard to effective utilization of the waste-heat from the gas compressor, there are cases of utilization for heating, utilization for hot water, utilization for preheating of water fed to a boiler and the like.

Incidentally, there are background arts of this kind described in Japanese Patent No. 4329875 (Patent Literature 1) and Japanese Unexamined Patent Application Publication No. 2012-67743 (Patent Literature 2).

According to the background art described in Patent Literature 1, a compressor is driven by using steam, and consumption energy of a boiler is reduced by utilizing heat generated at the compressor for preheating water (feed water) supplied to the boiler.

According to the background art of Patent Literature 2, a waste-heat-recovery heat exchanger is provided to an oil-cooled gas compressor, and waste-heat from oil or the like heated by cooling the compressor is enabled to recover.

CITATION LIST

Patent Literature

Patent Literature 1: Japanese Patent No. 4329875
Patent Literature 2: Japanese Unexamined Patent Application Publication No. 2012-67743

SUMMARY OF INVENTION

Technical Problem

According to the background art of Patent Literature 1, the heat generated at an air compressor is utilized for preheating the feed water of the boiler, the background art includes a single water cooling system as a cooling system of the air compressor, the heat generated at the air compressor is absorbed by water of the water cooling system, and by mixing the water a temperature of which is elevated by the heat with the feed water to the boiler, a temperature of the feed water to the boiler is elevated, and consumption energy of the boiler is reduced.

According to the background art of Patent Literature 1, although the temperature of water replenished to a feed water tank can be elevated by the heat generated by the air compressor, the temperature of the replenished water becomes a temperature lower than a delivery temperature of the air compressor by several tens degrees even under a condition of reducing the water amount to an extreme. Further, the lower the load factor of the compressor, the lower the temperature of the replenished water.

Therefore, according to the waste-heat recovery system described in Patent Literature 1, although the waste-water recovery system can be utilized for a system in which a temperature of water of the replenished water or the like may simply be elevated by utilizing the compressor waste-heat, in a case where the supplied hot water has a lower limit in a requested hot water temperature, or under a condition in which a lower limit of the requested hot water temperature is lower than the delivery temperature of the compressor only by several degrees, there poses a problem that the hot water having a requested temperature cannot be fed. Also, there poses a problem that when the water amount is reduced for elevating the temperature of the replenished water, a heat exchange rate is deteriorated as well.

According to the background art of Patent Literature 2, although in the waste-heat-recovery heat exchanger, the cooling water is heated by subjecting the oil at a high temperature flowing in an oil piping and compressed air at a high temperature flowing in a gas piping, and the cooling water from the waste-heat recovery apparatus to heat exchange, no consideration is given to heat emitted from the waste-heat-recovery heat exchanger in a case where the oil-cooled gas compressor is brought into an unload operation (no-load operation) or a stoppage state. Therefore, in a case where the temperature of the cooling water (hot water) of the waste-heat recovery apparatus is high, there poses a problem that heat is emitted from a side of the waste-heat recovery apparatus when the oil-cooled gas compressor is brought into the unload operation or the stoppage state, and the waste-heat recovery rate is deteriorated.

It is an object of the present invention to provide a waste-heat recovery system in an oil-cooled gas compressor which can supply hot water at a requested temperature, and which can improve the waste-heat recovery rate by restraining the heat emitted from the side of the waste-heat recovery apparatus even in the case where the compressor load factor is low.

Solution to Problem

In order to resolve the problem described above, the present invention is a waste-heat recovery system in an oil-cooled gas compressor including a compressor main body, an oil separator for separating oil from compressed gas delivered from the compressor main body, a gas piping for sending the compressed gas separated from the oil by the oil separator to a demanded destination, an oil piping for returning the oil separated by the oil separator to the compressor main body, and a waste-heat-recovery heat exchanger for recovering heat from at least either of the compressed gas flowing through the gas piping or the oil flowing through the oil piping, further including a stored hot water tank for storing the heat from the waste-heat-recovery heat exchanger in a form of hot water, a circulation circuit for circulating a heat medium between the waste-heat-recovery heat exchanger and the stored hot water tank for moving the heat received from the waste-heat-recovery heat exchanger to the stored hot water tank, a circulation pump provided at the circulation circuit, and a control device for controlling to stop the circulation pump or reduce the rotational frequency thereof in a case where a temperature of the oil or the compressed gas subjected to heat exchange by the waste-heat-recovery heat exchanger is equal to or lower than a temperature of the hot water in the stored hot water tank.

Advantageous Effects of Invention

According to the present invention, there can be provided a waste-heat recovery system in an oil-cooled gas compressor which can supply hot water at a requested temperature, and a waste-heat recovery rate can be improved by restraining heat emitted from a side of the waste-heat recovery apparatus even in a case where a compressor load factor is low.

DESCRIPTION OF EMBODIMENTS

An explanation will be given of a specific embodiment of a waste-heat recovery system in an oil-cooled gas compressor of the present invention in reference to the drawings as follows. In the respective drawings, portions attached with the same notations designate the same portions or corresponding portions.

First Embodiment

An explanation will be given of the first embodiment of the waste-heat recovery system in the oil-cooled gas compressor according to the present invention in reference to the system diagram shown in FIG. 1.

Figure 1:
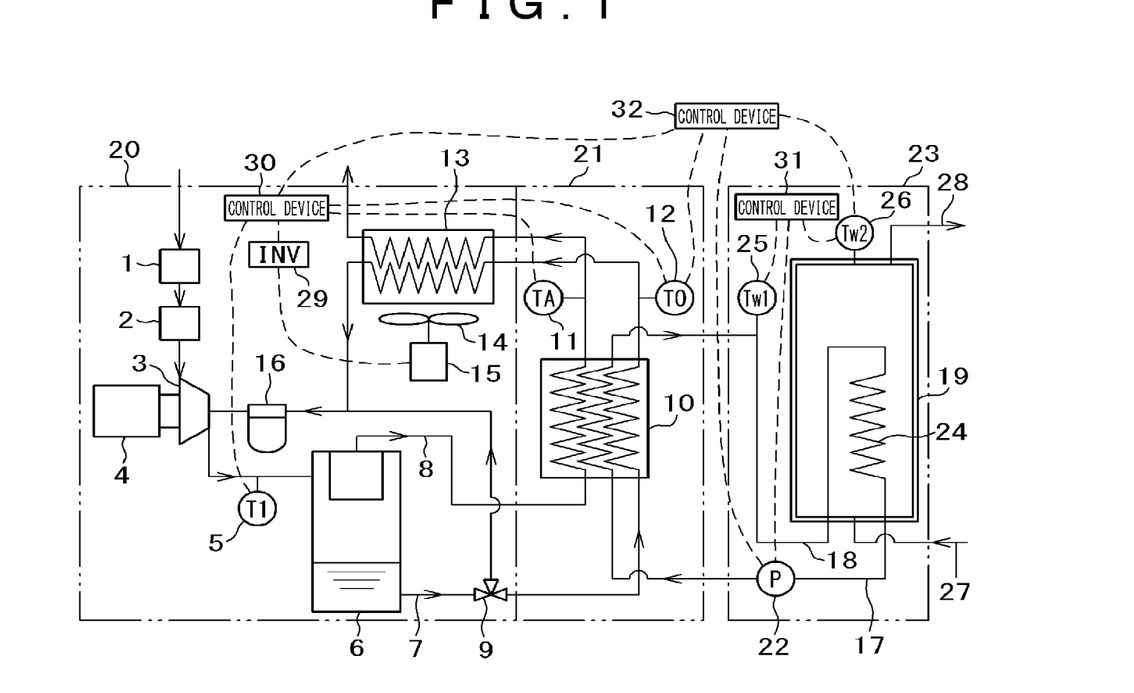
FIG. 1 is a system diagram showing a first embodiment of a waste-heat recovery system in an oil-cooled gas compressor according to the present invention.

In FIG. 1, numeral 3 designates a compressor main body, and according to the present embodiment, the compressor main body is configured by an oil-cooled screw air compressor. When the compressor main body 3 is driven by a motor 4, gas (air) sucked into a compressor unit 20 is sucked into the compressor main body 3 via a suction filter 1 and a suction throttle valve 2, thereafter, compressed and delivered, and flows into an oil separator (oil tank) 6. Numeral 5 designates a delivery temperature sensor (compressor main body outlet temperature sensor) (T1) for detecting a temperature of compressed gas (compressed air) delivered from the compressor main body 3. After the temperature is detected by the delivery temperature sensor 5, the compressed gas flows into the oil separator 6.

The compressed gas which flows into the oil separator 6 is mixed with oil (lubricant), in the oil separator 6, the compressed gas and the oil are centrifugally separated, the compressed gas flows out from a gas piping (air piping) 8 at an upper portion of the oil separator 6 and flows into a waste-heat-recovery heat exchanger 10 configured by a water-cooled heat exchanger. The oil stored to a lower portion of the oil separator 6 flows out from an oil piping 7, flows to a side of the waste-heat-recovery heat exchanger 10 in a case where the oil temperature is high, and bypasses to flow to a side of the oil filter 16 in a case where the oil temperature is low by a temperature control valve 9. The oil passing through the oil filter 16 is configured to flow into the compressor main body 3 again.

The waste-heat-recovery heat exchanger 10 is connected to a stored hot water tank unit (waste-heat recovery apparatus) 23. In a case where the stored hot water tank unit 23 is operated, a heat medium (fluid such as water) is circulated to the waste-heat-recovery heat exchanger 10 via circulation pipings (heat medium inlet piping 17 and heat outlet piping 18) and a heat amount of compression heat generated at the compressor main body 3 is configured to recover by the stored hot water tank unit 23 by making the heat medium flow from the heat medium inlet piping 17 to the waste-heat-recovery heat exchanger 10 and recovering the heat medium as the heat medium a temperature of which is elevated from the heat medium outlet piping 18.

That is, according to the waste-heat-recovery heat exchanger 10, the heat medium is configured to be heated and the compressed gas and oil are configured to be cooled by subjecting the oil at the high temperature flowing through the oil piping 7 and the compressed gas at the high temperature flowing through the gas piping 8, and the heat medium from the stored hot water tank unit 23, to heat exchange.

The waste-heat-recovery heat exchanger 10 is arranged in a waste-heat recovery unit 21. Further, the stored hot water tank unit 23 is provided with a hot-water storage tank 19 for storing water (as water, a case of hot water is included), and the hot-water storage tank 19 is connected with a water inlet piping 27 for supplying water, and a hot water outlet piping 28 for sending water the temperature of which is elevated (hot water) by the hot-water storage tank 19 to a hot water supply destination. Further, a water-to-water heat exchanger 24 is installed in the hot-water storage tank 19, and a temperature of water in the hot-water storage tank 19 is configured to be elevated by subjecting the heat medium flowing in the circulation pipe and water (hot water) in the hot-water storage tank 19 to heat exchange.

Further, a circulation pump 22 for circulating the heat medium is provided at the circulation pipings. According to the present embodiment, the circulation pump 22 is installed at the heat medium inlet piping 17 in the stored hot water tank unit 23, but the circulation pump 22 may be installed at the heat medium outlet piping 18. The heat medium can be circulated to the waste-heat-recovery heat exchanger 10 and the hot-water storage tank 19 by a number of times by the circulation pump 22 via the circulation pipings 17 and 18. Thereby, a temperature of water in the hot-water storage tank 19 can be elevated to a predetermined temperature which is previously determined. Also, even in a case where the load factor of the air compressor is small, the delivery temperature of the air compressor can be maintained basically regardless of the load factor, and therefore, hot water at a requested temperature can be supplied regardless of the load factor of the air compressor. Therefore, even in a case where there is the requested hot water temperature lower limit and in a case where the requested hot water temperature lower limit is lower than the compressor delivery temperature only by several degrees, the hot water at the requested temperature can be supplied regardless of the load factor of the compressor.

An air cooling heat exchanger 13 is provided on a downstream side of the waste-heat-recovery heat exchanger 10, and the compressed gas and the oil passing through the waste-heat-recovery heat exchanger 10 are configured to also pass through the air cooling heat exchanger 13. That is, the compressed gas and the oil flow into the air cooling heat exchanger 13 after being cooled by the circulating heat medium at the waste-heat-recovery heat exchanger 10, or in a state of not being subjected to heat exchange with the heat medium in a case where the circulating pump 22 is stopped. In the air cooling heat exchanger 13, the compressed gas and the oil are configured to be able to be cooled by cooling wind blown by a cooling fan 14.

Numeral 15 designates a fan motor for driving the cooling fan 14, and is configured to be able to control the rotational frequency by an inverter 29. Therefore, in a case where temperatures of the compressed gas and the oil coming out from the waste-heat-recovery heat exchanger 10 are higher than a predetermined temperature, the compressed gas or the oil are configured to be able to be supplied by bringing the temperatures into a predetermined range by controlling the rotational frequency of the cooling fan 14 in accordance with the temperatures.

The compressed gas coming out from the air cooling heat exchanger 13 is supplied to a demanded destination at outside of the compressor unit 20, and the oil is injected into the compressor main body 3 via the oil filter 16 after being confluent with other oil in a case where there is other oil bypassed by the temperature control valve 9.

Next, a detailed explanation will be given of a control of supplying the compressed gas or the oil after bringing the temperatures to a desired temperature by controlling the rotational frequency of the cooling fan 14.

Numeral 30 designates a control device for controlling the rotational frequency of the fan motor 15, and to the control device 30, delivery temperature information from the delivery temperature sensor 5, temperature information of compressed air (compressed gas) from a temperature sensor (gas temperature sensor) (TA) 11 on a downstream side of the waste-heat-recovery heat exchanger 10, and temperature information of oil from a temperature sensor (oil temperature sensor) (TO) 12 are inputted.

Based on the pieces of temperature information, the control device 30 cools the oil injected to the compressor main body 3 to a proper temperature by changing the rotational frequency of the cooling fan 14 by controlling the fan motor 15 via the inverter 29 such that a temperature difference of the delivery temperature of the compressed gas detected by the delivery temperature sensor 5 from a previously set target delivery temperature is small. The cooled oil is injected to the compressor main body 3 via the oil filter 16.

That is, the rotation speed of the cooling fan 14 is controlled such that an amount of heat exchange at the cooling heat exchanger 13 is increased in a case where the heat exchange amount at the waste-heat-recovery heat exchanger 10 is small and such that the heat exchange amount at the air cooling heat exchanger 13 is reduced in a case where the heat exchange amount at the waste-heat-recovery heat exchanger 10 is large.

Each of heat exchanger capacities of the waste-heat-recovery heat exchanger 10 and the air cooling heat exchanger 13 is designed to be a capacity capable of processing a total heat amount generated at the compressor main body 3 by itself. Therefore, in a case where maximum heat recovery is carried out in the waste-heat-recovery heat exchanger 10, temperatures of the lubricant and the compressed air coming out from the waste-heat-recovery heat exchanger 10 are sufficiently cooled, and therefore, there is also a case where the fan motor 15 is stopped in the air cooling heat exchanger 13.

In a case of an oil-cooled screw air compressor, a number of times of circulation of the oil filled in the compressor unit 20 (a number of times of circulation of returning the oil delivered from the compressor main body 3 again to the compressor main body) is generally as large as about 2 through 5 times/minute, and therefore, when the rotation speed of the cooling fan 14 is changed, also the temperature of delivered compressed air detected by the delivery temperature sensor 5 is comparatively sensitively changed. Therefore, the temperature of the compressed air delivered from the compressor main body 3 can substantially be controlled to a target delivery temperature (delivery temperature in a predetermined range) by carrying out an inverter control of changing the rotational frequency of the cooling fan 14 in accordance with the temperature of the delivery temperature sensor 5.

Incidentally, according to the present embodiment, the temperature sensor (TA) 11 and the temperature sensor (TO) 12 are provided, and therefore, the temperature of the compressed air and the temperature of the oil flowing into the air cooling heat exchanger 13 are known, and therefore, the rotation speed of the cooling fan 14 can also be adjusted by taking also pieces of temperature information from the temperature sensors 11 and 12 into consideration, and the temperature of the compressed air delivered from the compressor main body 3 can further swiftly and accurately be made to be proximate to a target temperature.

As described above, the compressor unit 20 can be operated such that the temperature of the delivery temperature sensor 5 becomes constant, regardless of a waste-heat recovery situation (operating situation) of the stored hot water tank unit 23, that is, regardless of the heat exchange amount at the waste-heat-recovery heat exchanger 10 by executing the rotational frequency control of the cooling fan 14.

At inside of the stored hot water tank unit 23, there are provided a temperature sensor (heat medium temperature sensor) (Tw1) 25 for detecting a temperature of the heat medium flowing through the heat medium outlet piping 18 in the circulation pipings 17 and 18 circulating the heat medium between the waste-heat-recovery heat exchanger 10 and the hot-water storage tank 19, a temperature sensor (hot water temperature sensor) (Tw2) 26 for detecting a hot water temperature in the hot-water storage tank 19, and a control device 31. The control device 31 is inputted with temperature information of the temperature sensor 25 and the temperature sensor 26, and the control device 31 is configured to execute the control of the circulation pump 22 based on the pieces of temperature information. For example, in a case where the temperature detected by the temperature sensor (Tw2) 26 exceeds a previously determined temperature (for example, a requested temperature at a hot water supply destination), the control device 31 controls to stop the circulation pump 22 or reduce the rotational frequency.

Also, in a case where the temperature detected by the temperature sensor (Tw1) 25 is lower than the temperature detected by the temperature sensor (Tw2) 26, or lower by a predetermined temperature or more, there is a concern of lowering the hot water temperature in the hot-water storage tank 19, and therefore, also in this case, the circulation pump 22 may be stopped, or its rotational frequency may be reduced.

Further, the control device 31 can be made to have a function as output terminals for outputting the pieces of temperature information inputted from the temperature sensors 25 and 26 to outside. That is, based on the temperature information of the temperature sensors 25 and 26 outputted from the control device 31, the pieces of temperature information can be used for hot water control at the water inlet piping 27 and the hot water outlet piping 28. For example, in a case where the temperature detected by the temperature sensor (Tw2) 26 is equal to or higher than a previously determined temperature (requested temperature at hot water supply destination), it can be controlled such that hot water is supplied to the supply destination by opening a valve (not illustrated) provided at the hot water output piping 28, at the same time, water can be replenished into the hot-water storage tank 19 by also opening a valve (not illustrated) provided at the water inlet piping 27.

Further, the pieces of temperature information from the temperature sensors 25 and 26 can also be outputted from the control device 31 to an external display device, or a control device 32, to be described later, for controlling a total of the waste-heat recovery system.

Numeral 32 designates a control device for controlling the total of the waste-heat recovery system in the oil-cooled gas compressor shown in FIG. 1, and the control device 32 is provided in the stored hot water tank unit 23, or in the compressor unit 20. Further, the control device 32 is inputted with information of an oil temperature detected by the temperature sensor (TO) 12, and information of hot water temperature in the hot-water storage tank 19 detected by the temperature sensor (Tw2) 26, and controls to stop the circulation pump 22, or to reduce its rotational frequency in a case where the temperature detected by the temperature sensor 12 is equal to or lower than the temperature detected by the temperature sensor 26.

Incidentally, the control device 32 is configured to be able to input also a piece of information of the compressed gas temperature detected by the temperature sensor (TA) 11 via the control device 30, and therefore, in a case where the temperature detected by the temperature sensor 11 is equal to or lower than the temperature detected by the temperature sensor 26, the circulation pump 22 may be controlled to stop, or its rotational frequency may be controlled to reduce.

Also, the control device 32 can be made to have a function as an output terminal for outputting temperature information inputted from the temperature sensor (TA) 11, the temperature sensor (TO) 12, and the temperature sensor (Tw2) 26 to outside.

In a case where the compressor unit 20 is brought into a stoppage state or a no-load operating state, the waste-heat recovery heat amount which can be received from the waste-heat-recovery heat exchanger 10 is small. Also, in a case where the temperature of the oil flowing in the oil piping at the waste-heat-recovery heat exchanger 10 is lower than the hot water temperature in the hot-water storage tank 19, the heat in the hot-water storage tank 19 is moved to the waste-heat-recovery heat exchanger 10 via the heat medium flowing in the circulation circuits, and therefore, the waste-heat recovery rate is deteriorated.

In contrast thereto, according to the present embodiment, as described above, in a case where the temperature detected by the temperature sensor (TO) 12 or the temperature sensor (TA) 11 is equal to or lower than the temperature detected by the temperature sensor (Tw2) 26, for example, the circulation pump 22 is controlled to stop. Therefore, according to the present embodiment, deterioration in the waste-heat recovery rate can be prevented.

Further, based on the temperature information outputted from the control device 32 to outside, the temperature information can also be used for controlling the water inlet piping 27 and the hot water outlet piping 28. That is, in a case where the detected temperature of the temperature sensor (TO) 12 or the temperature sensor (TA) 11 is equal to or lower than the detected temperature of the temperature sensor (Tw2) 26, a further temperature rise of the hot water in the hot-water storage tank 19 cannot be desired, and therefore, also in this case, the hot water may be utilized by opening the valve provided at the hot water outlet piping 28, or water may be replenished into the hot-water storage tank 19 by opening also the valve provided at the water inlet piping 27.

Incidentally, in the embodiment shown in FIG. 1, the description has been given of the example of controlling to stop the circulation pump 22 or lower the rotational frequency in a case where the temperature of the oil or the compressed gas subjected to heat exchange at the waste-heat-recovery heat exchanger 10 is equal to or lower than the temperature of the hot water in the stored hot water tank detected by the hot water temperature sensor 26, but the control may be carried out as follows.

That is, in a case where the temperature of the oil or the compressed gas subjected to heat exchange at the waste-heat-recovery heat exchanger 10 is equal to or lower than the temperature detected by the heat medium temperature sensor 25, the circulation pump 22 may be controlled to stop or the rotational frequency may be controlled to reduce by the control device 32.

That is, the hot water temperature sensor 26 detects a temperature on an upper side of the hot-water storage tank 19, and therefore, ordinarily, the temperature detected by the heat medium temperature sensor 25 becomes a temperature substantially near to the temperature detected by the hot water temperature sensor 26. Therefore, even when the control is carried out by using the temperature detected by the heat medium temperature sensor 25, an effect substantially similar to that in a case of controlling by using the hot water temperature sensor 26 is achieved.

Further, in a case where the compressor main body 3 is brought into the stoppage state or the no-load operating state, and in a state in which the temperature of the hot water in the hot-water storage tank 19 is that in the midst of boiling, the temperature of the hot water in the hot-water storage tank 19 is high on the upper side and low on the lower side. Therefore, the heat medium is subjected to heat exchange also with water at a low temperature in the water-to-water heat exchanger 24, and therefore, the temperature of the heat medium flowing in the heat medium inlet piping 17 is lower than the temperature detected by the hot water temperature sensor 26. In the state, there can be a case where the temperature of the oil or the compressed gas in the waste-heat-recovery heat exchanger 10 is lower than the temperature detected by the hot water temperature sensor 26. However, even in the state, in a case where the temperature detected by the heat medium temperature sensor 25 is lower than the temperature detected by the oil temperature sensor 12 or the gas temperature sensor 11, the waste-heat recovery is carried out, and therefore, it is preferable to continue driving the circulation pump 22.

On the other hand, in a case where the temperature detected by the oil temperature sensor 12 or the gas temperature sensor 11 is lower than the temperature detected by the heat medium temperature sensor 25, heat is moved from the side of the heat medium to the side of the oil or the compressed gas, and therefore, in this case, the circulation pump 22 is stopped. By controlling in this way, the waste-heat recovery rate can be improved.

Further, according to the present embodiment, the explanation has been given of the example in which the control device 32 carries out the control by comparing the detected temperature of the temperature sensor (TO) 12 or the temperature sensor (TA) 11, and the detected temperature of the temperature sensor (Tw2) 26 or the temperature sensor (Tw1) 25. However, also the temperature information detected by the delivery temperature sensor (T1) 5 is configured to be inputted to the control device 32 via the control device 30, and therefore, the control described above can also be carried out by using the detected temperature of the delivery temperature sensor (T1) 5 in place of the temperature sensor (TO) 12 or the temperature sensor (TA) 11, and a substantially similar effect can be achieved also in this way. Further, a further accurate control can be carried out when the control is carried out by using the detected temperatures of all of the temperature sensors 5, 11, and 12.

Further, although according to the present embodiment, the example of installing only the single piece of the hot water temperature sensor (Tw2) 26 at the upper portion of the hot-water storage tank 19 is shown, a position of installing the hot water temperature sensor 26 is not limited to the upper portion but, for example, the hot water temperature sensor 26 may be installed at a vicinity of a center portion. Preferably, the hot water temperature sensor 26 may be installed at a portion on an upper side of the water-to-water heat exchanger 24. Further, when plural hot water temperature sensors 26 are installed in an up and down direction in the hot-water storage tank 19, and the control is carried out by using the plural temperature sensors, a waste heat recovery system which can further improve the waste-heat recovery rate can be established.

Further, in a case where the temperature detected by the delivery temperature sensor 5 is lower than the temperature detected by at least either of the oil temperature sensor 12 or the gas temperature sensor 11, it is believed that the temperature of the oil or the compressed gas subjected to heat exchange in the waste-heat-recovery heat exchanger 10 is lower than the temperature of the hot water in the hot-water storage tank 19. Therefore, in a case where the temperature detected by the delivery temperature sensor 5 is lower than the temperature detected by at least either of the oil temperature sensor 12 or the gas temperature sensor 11, the control device 32 determines that the temperature of the oil or the compressed gas subjected to the waste-heat-recovery heat exchanger 10 is lower than the temperature of the hot water in the hot-water storage tank 19, and may stop the circulation pump 22 or may reduce the rotational frequency.

Figure 2:
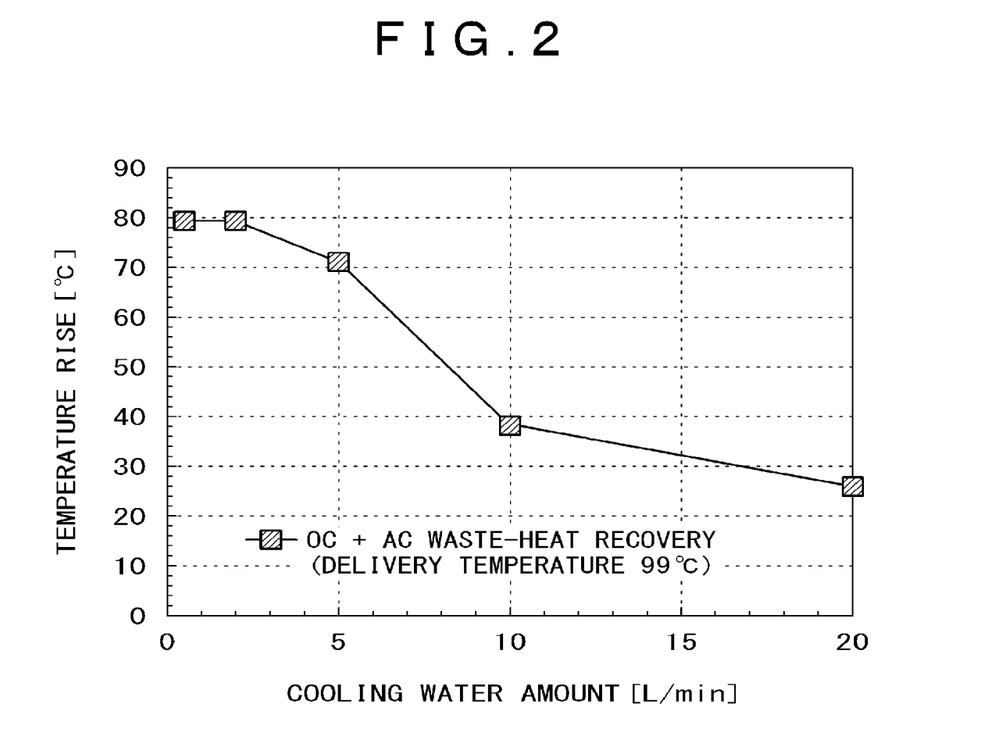
FIG. 2 is a diagram showing a relationship between a cooling water amount when a temperature of compressed gas delivered from a compressor main body is regarded as 100° C., and cooling water is made to flow to a waste-heat-recovery heat exchanger only once, and a temperature on an outlet side of the waste-heat-recovery heat exchanger of cooling water flowed in the system shown in FIG. 1.

FIG. 2 is a diagram showing a test result of a relationship between a cooling water amount and a temperature rise of the passed cooling water at the outlet of the waste-heat-recovery heat exchanger when the temperature of the compressed gas delivered from the compressor main body 3 is made to be about 100° C. (in FIG. 2 described as "delivery temperature 99° C.") and when the cooling water is not circulated to the waste-heat-recovery heat exchanger 10 by a number of times but is passed therethrough only once in the waste-heat recovery system of the oil-cooled gas compressor shown in FIG. 1.

An explanation will be given of a specific effect of the temperature rise at the waste-heat-recovery heat exchanger 10 according to the present embodiment by utilizing the test result of FIG. 2. The test result is a result of carrying out a test in a waste-heat recovery system in which the hot-water storage tank 19 is not present in the waste-heat recovery system shown in FIG. 1. The abscissa designates the cooling water amount flowing to the waste-heat-recovery heat exchanger 10, and the ordinate designates the temperature rise of the hot water after passing through the waste-heat-recovery heat exchanger 10. Further, the diagram indicates the temperature (temperature rise) of the cooling water obtained by recovering waste heat combining a side of the oil piping 7 (side of oil cooler OC) and a side of the gas piping 8 (side of air cooler AC) in the waste-heat-recovery heat exchanger 10.

As is known from FIG. 2, although the more reduced the cooling water amount, the higher the temperature of the hot water obtained, at the cooling water amount equal to or less than 2 L/min, the temperature of the hot water cannot be elevated even when the cooling water amount is further reduced by a limit of a capability of the waste-heat-recovery heat exchanger 10, the hot water temperature cannot be elevated even when the cooling water amount is further reduced, and an elevation of the hot water temperature is up to a limit at 80° C. That is, in a case where the water is passed to the waste-heat-recovery heat exchanger 10 only once (that is, case of 1 pass water passing), the temperature of hot water obtained by waste-heat recovery from an oil-cooled screw compressor (capacity of 22 kW is used in this example) in which the temperature of the outlet of the compressor main body is set to be about 100° C. has a limit of the temperature rise up to 80° C.

In contrast thereto, in a case of the waste-heat recovery system in the oil-cooled gas compressor shown in FIG. 1, water (hot water) is circulated between the hot-water storage tank 19 and the waste-heat-recovery heat exchanger 10 by a number of times via the circulation piping 17 and 18, and therefore (because not water passing by only once but multi-pass water passing of circulating by a number of times), the temperature in the hot-water storage tank 19 can finally be elevated to a temperature near to the delivery temperature of the compressor, for example, about 93° C.

That is, in comparison with the case of the water passing by only once (1 pass water passing) under the same condition, the hot water at a high temperature of about 93° C. in which the temperature is higher by more than 10° C. can be obtained. Also, in a case where the water is passed to the waste-heat-recovery heat exchanger 10 only once, when the load factor of the compressor is low, also the temperature of the hot water obtained is lowered. However, the compressor can maintain the delivery temperature basically regardless of the load factor, and therefore, the hot water at a requested temperature can be supplied regardless of the load factor of the compressor by constructing the configuration of the present embodiment described above.

Figure 3:
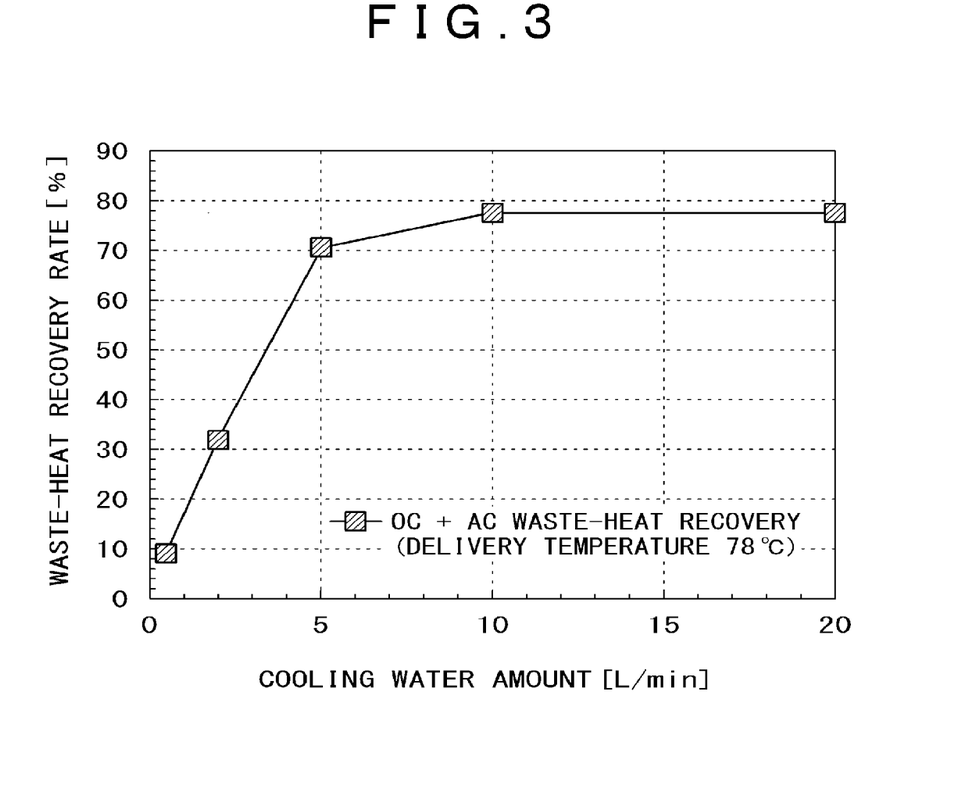
FIG. 3 is a diagram showing a relationship between a cooling water amount when a temperature of compressed gas delivered from a compressor main body is regarded as 100° C., and cooling water is made to flow to a waste-heat-recovery heat exchanger only once and a waste-heat recovery rate by the cooling water flowed in the system shown in FIG. 1.

FIG. 3 is a diagram showing a test result of a relationship between the cooling water amount and the waste-heat recovery rate by the cooling water passed when the temperature of the compressed gas delivered from the compressor main body 3 is made to be about 78° C., and the cooling water is not circulated to the waste-heat-recovery heat exchanger 10 by a number of times but is passed therethrough only once in the waste-heat recovery system of the oil-cooled gas compressor shown in FIG. 1.

FIG. 3 shows a result of carrying out a test in a waste-heat recovery system in which the hot-water storage tank 19 is not present in the waste-heat recovery system shown in FIG. 1 similar to FIG. 2. The abscissa designates the cooling water amount to the waste-heat-recovery heat exchanger, and the ordinate designates the waste-heat recovery rate by passing the cooling water to the waste-heat-recovery heat exchanger 10. Also, the diagram indicates the waste-heat recovery rate by recovering the waste-heat combining a side of the oil piping 7 (side of oil cooler OC) and a side of the gas piping 8 (side of air cooler AC) in the waste-heat-recovery heat exchanger 10. Here, the waste-heat recovery rate is a value of the heat amount received by the waste-heat-recovery heat exchanger 10 divided by a total input of the compressor, and the higher the waste-heat recovery rate, the more effectively utilized the compressor waste-heat.

As is known from FIG. 3, the more reduced the cooling water amount, the lower the waste-heat recovery rate, and at the cooling water amount of 2 L/min at which the highest hot water temperature can be ensured in FIG. 2 described above, as shown in FIG. 3, the waste-heat recovery rate is only about 10%, and it is known that the efficiency of recovering the waste-heat is very poor. That is, in a case of generating hot water by passing the water therethrough only once and in a case where the hot water at a high temperature to some degree is requested, it is necessary to reduce the cooling water amount, and therefore, the waste-heat recovery rate is very low.

Conversely, when the cooling water amount is increased, at a cooling water amount to some degree or more (in FIG. 3, equal to or more than 10 L/min), the waste-heat recovery rate can be increased near to 80%, and although even when the cooling water is increased more, the waste-heat recovery rate cannot be increased more, the waste-heat recovery rate can be maintained at a high value. That is, in view of the test result of FIG. 3, the heat exchange can be carried out at a high waste-heat recovery rate by making the cooling water amount equal to or more than 10 L/min (for example, 20 L/min). Therefore, according to the present embodiment shown in FIG. 1, not only hot water at a high temperature can be obtained, but the waste-heat recovery system having the high waste-heat recovery rate can be established by setting the cooling water amount (for example, circulation water amount of 20 L/min).

Next, an explanation will be given of an application case in a case of applying the present invention to a cleaning facility by hot water. The application example of the cleaning facility is a facility provided with two heaters of 5 kW in a background art, a temperature of water of 300 L is elevated from 20° C. to 80° C. or higher by conducting electricity thereto, and cleaning is carried out by the obtained hot water. Here, when a calculation is made by assuming that all of the heat amount by conducting electricity to the heaters is used for elevating the temperature of water, a time period required for elevating the temperature to 80° C. or higher becomes about two hours. However, in an actual facility, heat was emitted naturally to the atmosphere, and therefore, the temperature of the water was elevated to that of the hot water having a target temperature of 80° C. or higher by conducting electricity for 2.5 hours or longer. Further, ON/OFF of the heater of 5 kW was repeated for keeping the temperature of the hot water at 80° C. or higher even in an operation of eight hours per day. Thereby, in the background art, a total of the power of about 47 kWh was consumed.

The example of applying the present invention to the cleaning facility by the hot water will be explained. An oil-cooled screw air compressor unit (air cooling type) having a capacity of 22 kW has conventionally be installed on a side of the cleaning facility. Hence, a system of producing hot water used in the cleaning facility by utilizing the waste-heat of the compressor unit was investigated, and the hot water was produced as the waste-heat recovery system as shown in FIG. 1. A circulation amount of water (hot water) from the hot-water storage tank 19 to the waste-heat-recovery heat exchanger 10 shown in FIG. 1 was made to be 20 L/min.

Thereby, as has been explained in reference to FIG. 3, the heat recovery rate as high as 80% was achieved, a time period required for elevating a temperature of water of 300 L from 20° C. to 80° C. or higher was 120 minutes (two hours), and a target temperature was reached 30 minutes earlier than that of the background art using the heater. Further, after reaching the target temperature of 80° C., the target temperature of 80° C. or higher could be kept by the compressor waste-heat, and therefore, a used power amount of 47 kWh per day in utilizing the heater of the background art could be brought to be 0 kWh. Further, high temperature water at 80° C. or higher could be obtained. This is achieved by applying the present invention of circulating the hot water in the stored hot water tank to the waste-heat-recovery heat exchanger by a number of times, and the temperature is difficult to be reached when the water is passed to the waste-heat-recovery heat exchanger only once.

Second Embodiment

Figure 4:
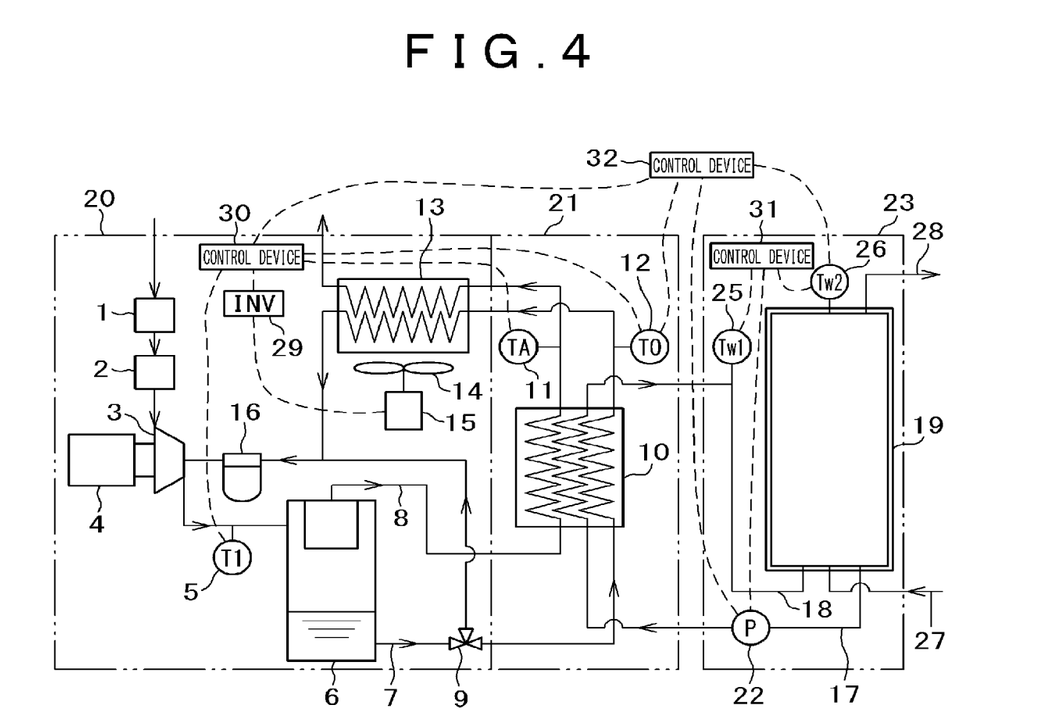
FIG. 4 is a system diagram showing a second embodiment of a waste-heat recovery system in an oil-cooled gas compressor according to the present invention.

An explanation will be given of a second embodiment of a waste-heat recovery system in an oil-cooled gas compressor according to the present invention in reference to a system diagram shown in FIG. 4. In FIG. 4, portions attached with notations the same as those of FIG. 1 described above indicate the same or corresponding portions, and therefore, the explanation will be given centering on portions different from the first embodiment shown in FIG. 1.

In the first embodiment described above, the explanation has been given of the example in which the water-to-water heat exchanger 24 is provided in the hot-water storage tank 19, and the heat medium circulating to the circulation circuits 17 and 18 are made to pass through the water-towater heat exchanger 24 to thereby subject the heat medium to heat exchange with water (hot water) in the hot-water storage tank 19.

In contrast thereto, the second embodiment differs from the first embodiment in that the water-to-water heat exchanger 24 shown in FIG. 1 is not provided, and the heat medium for circulating through the circulation circuits 17 and 18 is made to be water (as water, a case of hot water is also included) in the hot-water storage tank 19.

That is, water in the hot-water storage tank 19 of the stored hot water tank unit 23 is configured to be guided from a lower portion of the hot-water storage tank 19 directly to the heat medium inlet piping 17, and is sent to the waste-heat-recovery heat exchanger (water-cooled heat exchanger) 10 of the waste-heat recovery unit 21 by the circulation pump 22. The water (heat medium) sent to the waste-heat-recovery heat exchanger 10 is subjected to heat exchange with the oil at a high temperature flowing through the oil piping 7 and the compressed gas at a high temperature flowing through the gas piping (air piping) 8 in the waste-heat-recovery heat exchanger and is heated by recovering heat from the oil and the compressed gas.

The oil and the compressed gas the heat of which is recovered by water to be cooled are configured to be sent to the air cooling heat exchanger 13 installed on the downstream side via the oil piping 7 or the gas piping 8 to further be cooled. Further, the water (hot water) the temperature of which is elevated by being heated by the waste-heat-recovery heat exchanger 10 is returned to the hot-water storage tank 19 via the heat medium outlet piping 18. In this way, the water in the hot-water storage tank 19 is circulated to the waste-heat-recovery heat exchanger 10 repeatedly. Therefore, the temperature of water in the hot-water storage tank 19 can gradually be elevated.

Thereby, the temperature of the water in the hot-water storage tank 19 can be elevated to a previously determined prescribed temperature. Further, even in a case where the load factor of the air compressor is reduced, hot water at a requested temperature can be supplied regardless of the load factor, and therefore, even in a case where there is a requested lower limit temperature of the hot water as well as the requested temperature is lower than the compressor deliver temperature by several degrees, the hot water at the requested temperature can be supplied.

Even the configuration as in the second embodiment can achieve an effect similar to that of the first embodiment. Also, according to the second embodiment, it is not necessary to provide the water-to-water heat exchanger as shown in the first embodiment, and therefore, its structure is simplified and the configuration can inexpensively be fabricated, and the waste-heat recovery rate can be improved by an amount of dispensing with heat exchange by the water-to-water heat exchanger.

Further, water can be subjected to heat exchange at the waste-heat-recovery heat exchanger 10 by guiding water from the lowest portion in the hot-water storage tank 19, and therefore, the water at the lowest temperature in the hot-water storage tank 19 and the oil and the compressed gas at high temperatures from the compressor are subjected to heat exchange, and therefore, the waste-heat recovery rate can further be improved.

Other configuration or control is similar to that of the first embodiment, and therefore, an explanation thereof will be omitted.

As has been explained above, according to the respective embodiments of the present invention, there is provided the waste-heat-recovery heat exchanger 10 for recovering heat from at least either of the compressed gas flowing through the gas piping 8 or the oil flowing through the oil piping 7; further, there are provided the hot-water storage tank 19 for storing heat received from the waste-heat-recovery heat exchanger 10 as hot water, the circulation circuits (circulation pipings 17 and 18) for circulating the heat medium (fluid of water or the like) between the waste-heat-recovery heat exchanger 10 and the hot-water storage tank 19 for moving the heat received from the waste-heat-recovery heat exchanger 10 to the hot-water storage tank 19, the circulation pump 22 provided at the circulation circuits, and the control device for controlling to stop the circulation pump or reduce its rotational frequency in a case where the temperature of the oil or the compressed gas subjected to heat exchange at the waste-heat-recovery heat exchanger is equal to or lower than the temperature of the hot water in the stored hot water tank.

Therefore, there can be provided the waste-heat recovery system in the oil-cooled gas compressor which can supply hot water at a requested temperature even in a case where the compressor load factor is low, and which can improve the waste-heat recovery rate by restraining heat emission from the waste-heat recovery apparatus.

That is, according to the present embodiments, as a cooling system of the oil-cooled gas compressor, in addition to the air cooling heat exchanger 13 which is the main first cooling system, the waste-heat-recovery heat exchanger 10 which is a second cooling system is provided, and the stored hot water tank unit (waste-heat recovery apparatus) 23 is provided along with the compressor unit 20 to thereby configure a waste-heat recovery system, and the heat medium (in the embodiment described above, water) is made to be circulated by a number of times between the hot-water storage tank 19 and the waste-heat-recovery heat exchanger 10 via the circulation pipings 17 and 18. Therefore, the temperature of the hot water in the hot-water storage tank 19 can be elevated up to a temperature lower than the compressor outlet temperature by several ° C. (temperature near to compressor outlet temperature).

The outlet temperature of the oil-cooled screw compressor is as low as 100° C. or lower, and therefore, in a case of producing hot water by its waste heat, the temperature is further lowered by a limit of the heat exchanger. However, the temperature of the hot water extremely near to the compressor outlet temperature can be achieved by adopting the present embodiment.

Further, the control device controls to stop the circulation pump 22 or lower its rotational frequency in a case where the temperature of the oil or the compressed gas subjected to heat exchange at the waste-heat-recovery heat exchanger 10 is equal to or lower than the temperature of the hot water in the hot-water storage tank 19, and therefore, the waste-heat recovery rate can also be restrained from being deteriorated by moving heat in the hot-water storage tank 19 to the waste-heat-recovery heat exchanger 10 via the heat medium flowing through the circulation circuits.

Further, according to the present embodiments, the cooling fan 14 for blowing wind to the air cooling heat exchanger 13 in the compressor unit 20 is configured to be able to control the rotational frequency regardless of a heat exchange amount at the waste-heat-recovery heat exchanger 10, that is, regardless of operating situation of the stored hot water tank unit (waste-heat recovery apparatus) 23, and therefore, the outlet temperature of the compressor main body 3 can be controlled to be a constant target temperature. Therefore, there can be provided a waste-heat recovery system in an oil-cooled gas compressor in which it is not necessary to make the operating situation of the stored hot water tank unit (waste-heat recovery apparatus) 23 and the operating situation of the compressor unit 20 coincide with each other.

Further, the present invention is not limited to the embodiments described above but includes various modified examples.

For example, although in the respective embodiments described above, the explanation has been given by taking an example of the air-cooled type screw air compressor as the oil-cooled gas compressor, the present invention is not limited thereto but can similarly be applied even to a compressor of other system, for example, a scroll compressor.

Further, also a medium compressed by the oil-cooled gas compressor is not limited to air but the present invention can similarly be applied to a compressor which compresses other gas. Further, also as a drive source, other drive source other than a motor, for example, an engine or a turbine or the like will do.

Further, although in the embodiments described above, the explanation has been given of the waste-heat recovery system in the oil-cooled gas compressor by the example in which three units of the compressor unit 20, the waste-heat recovery unit 21, and the stored hot water tank unit 23 are arranged in parallel and connected, the three units can be integrated to configure one unit or two units.

Further, the embodiments described above have been explained in details for explaining the present invention to be easy to understand, and the present invention is not necessarily limited to provide all of the configurations explained.

LIST OF REFERENCE SIGNS

1: suction filter
2: suction throttle valve
3: compressor main body
4: main motor
5: delivery temperature sensor (compressor main body outlet temperature sensor)
6: oil separator (oil tank)
7: oil piping
8: gas piping (air piping)
9: temperature control valve
10: waste-heat-recovery heat exchanger (water-cooled heat exchanger)
11: temperature sensor (gas temperature sensor) (TA)
12: temperature sensor (oil temperature sensor) (TO)
13: air cooling heat exchanger
14: cooling fan
15: fan motor
16: oil filter
17, 18: circulation pipings (circulation circuits) (17: heat medium inlet piping, 18: heat medium outlet piping)
19: stored hot water tank
20: compressor unit
21: waste-heat recovery unit
22: circulation pump
23: stored hot water tank unit (waste-heat recovery apparatus)
24: water-to-water heat exchanger
25: temperature sensor (heat medium temperature sensor) (Tw1)
26: temperature sensor (hot water temperature sensor) (Tw2)
27: water inlet piping
28: hot water outlet piping
29: inverter
30 through 32: control devices

The invention claimed is:

1. A waste-heat recovery system comprising:
a waste-heat-recovery heat exchanger configured to recover heat from a compressed gas by connecting to a gas piping that sends the compressed gas delivered from the compressor main body to customers;
a tank that stores water that exchanges heat with heat medium exchanged heat with the compressed gas in the waste-heat-recovery heat exchanger;
a circulation circuit that connects to the waste-heat-recovery heat exchanger and the tank, and in which the heat medium circulates;
a circulation pump installed in the circulation circuit;
a control device that is configured to obtain the temperature of the heat medium flowing through a heat medium outlet piping of the circulation circuit and the temperature of the water stored in the tank, wherein
the control device stops the circulation pump or reduces the rotational frequency thereof in a case where the temperature of the heat medium flowing through the heat medium outlet piping is lower, or lower by a predetermined temperature or more, than the temperature of the water;
a unit configured to store the waste-heat-recovery heat exchanger; and
a tank unit configured to store the tank.

2. A waste-heat recovery system comprising:
a waste-heat-recovery heat exchanger configured to recover heat from a compressed gas by connecting to a gas piping that sends the compressed gas delivered from the compressor main body to customers;
a tank that stores heat medium exchanged heat with the compressed gas in the waste-heat-recovery heat exchanger;
a circulation circuit that connects to the waste-heat-recovery heat exchanger and the tank, and in which the heat medium circulates;
a circulation pump installed in the circulation circuit;
a control device that is configured to obtain the temperature of the heat medium flowing through a heat medium outlet piping of the circulation circuit and the temperature of the heat medium stored in the tank, wherein
the control device stops the circulation pump or reduces the rotational frequency thereof in a case where the temperature of the heat medium flowing through a heat medium outlet piping is lower, or lower by a predetermined temperature or more, than the temperature of the heat medium stored in the tank;
a unit configured to store the waste-heat-recovery heat exchanger; and
a tank unit configured to store the tank.

3. A waste-heat recovery system comprising:
a waste-heat-recovery heat exchanger configured to recover heat from a compressed gas by connecting to a gas piping that sends the compressed gas delivered from the compressor main body to customers;
a tank that stores heat medium exchanged heat with the compressed gas in the waste-heat-recovery heat exchanger;
a circulation circuit that connects to the waste-heat-recovery heat exchanger and the tank, and in which the heat medium circulates;
a circulation pump installed in the circulation circuit;

a control device that is configured to obtain the temperature of the heat medium flowing through a heat medium outlet piping of the circulation circuit and the temperature of the heat medium stored in the tank, wherein the control device stops the circulation pump or reduces the rotational frequency thereof in a case where the temperature of the heat medium flowing through a heat medium outlet piping is lower, or lower by a predetermined temperature or more, than the temperature of the heat medium stored in the tank, wherein the compressor main body performs no-load operation.

* * * * *